Dec. 3, 1940.                H. C. BOWEN                2,223,546
                               BRAKE
                          Filed Dec. 3, 1938
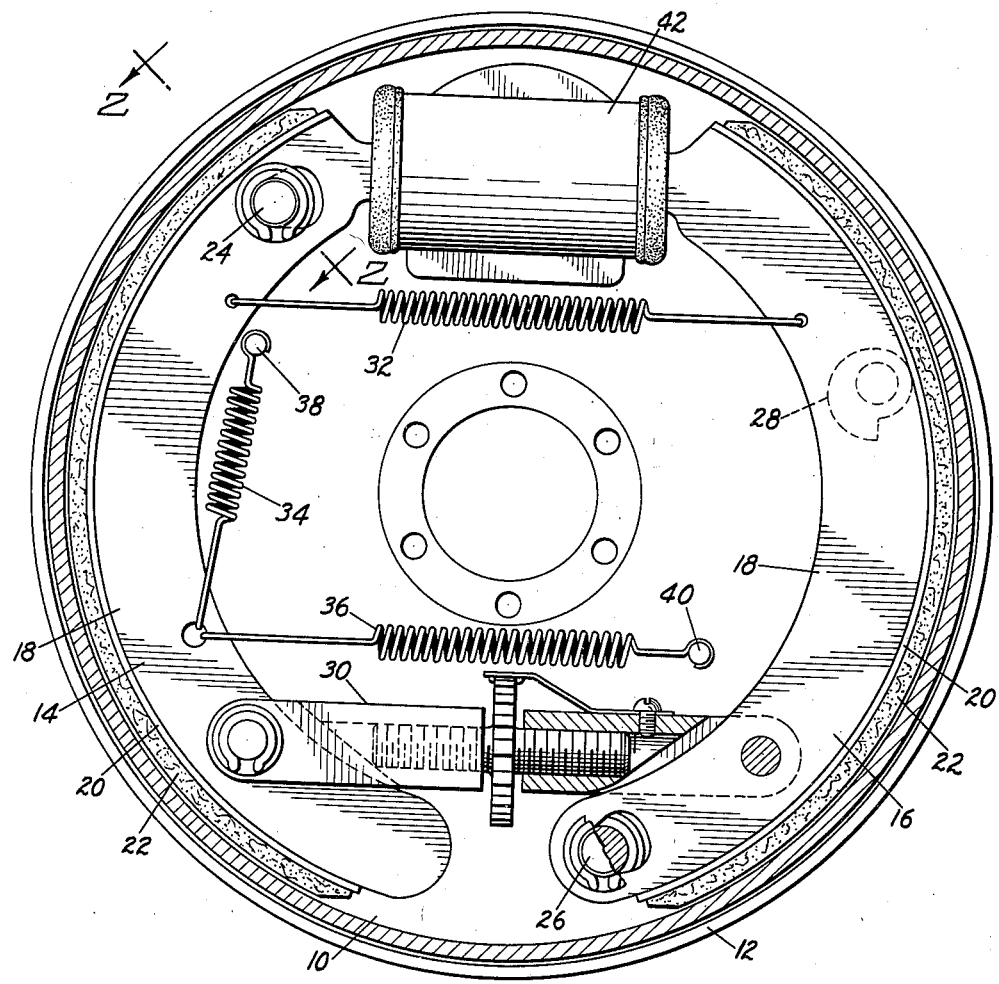
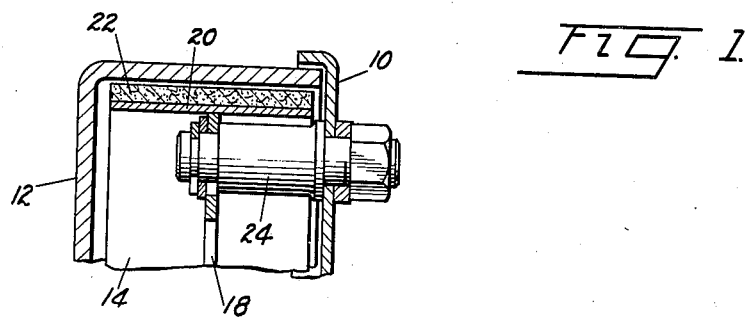
INVENTOR.
HERBERT C. BOWEN
BY
ATTORNEY.

Patented Dec. 3, 1940

2,223,546

UNITED STATES PATENT OFFICE 2,223,546

BRAKE

Herbert C. Bowen, Detroit, Mich., assignor to Hydraulic Brake Company, Detroit, Mich., a corporation of California Application December 3, 1938, Serial No. 243,864

6 Claims. (Cl. 188—78)

This invention relates to brakes, and more particularly to brakes for motor vehicles.

Broadly the invention comprehends a motor vehicle brake of the internal expanding type including a pair of corresponding interchangeable friction elements or shoes so connected and mounted as to preserve uniformity of action and controllability of the anchored shoe in one direction of braking, and to function as a conventional duo-servo brake in the other direction of braking.

An object of the invention is to provide a brake structure operative to function as a link brake in one direction of braking, and as a duo-servo brake in the other direction of braking.

Another object of the invention is to provide a brake including a pair of corresponding interchangeable friction elements or shoes so anchored and connected as to increase effectiveness of the anchored shoe in both forward and reverse braking.

Another object of the invention is to provide a brake including a pair of shiftably mounted friction elements or shoes so connected and actuated that the applied actuating force, augmented by the wiping action of the drum, may be partly transmitted from the forward braking shoe to the reverse braking shoe to the end that the brake may be rendered more effective.

Other objects and advantages of the invention will appear from the following description taken in connection with the drawing forming a part of this specification, and in which—

Fig. 1 is a vertical sectional view of a brake taken just back of the head of the drum illustrating the invention as applied; and Fig. 2 is a sectional view taken substantially on line 2—2, Fig. 1.

Referring to the drawing for more specific details of the invention, 10 represents a fixed support or backing plate adapted to be secured to an axle or to an axle housing. A rotatable drum 12 associated with the backing plate is adapted to be secured to a wheel, and a pair of corresponding interchangeable friction elements or shoes 14 and 16 are mounted on the backing plate for cooperation with the drum.

Each of the shoes includes a web 18 supporting a rim 20 having suitably secured thereto a lining 22. The shoes are mounted on diametrically disposed anchors 24 and 26 arranged on the backing plate 10, and a retractile stop 28 also arranged on the backing plate serves to support the shoes, when in retracted position, in proper spaced relation to the drum. The shoes are shiftably mounted on the anchors 24 and 26. As shown, the anchor 24 supports the toe of the forward braking shoe 14, and the anchor 26 supports the heel of the trailing or reverse braking shoe 16.

An adjustable link 30 connects the forward braking shoe to the trailing or reverse braking shoe adjacent the heels of the respective shoes. The shoes are also connected by a retractile spring 32, and the forward braking shoe is connected by retractile springs 34 and 36 to fixed supports 38 and 40 suitably arranged on the backing plate. The spring 32 serves to return the shoes upon completion of a braking operation to their retracted position on the stop 28, the spring 34 serves to lift the forward braking shoe 14 against the anchor 24, and the spring 36 serves to hold the reverse braking shoe on the anchor 26.

An operating means for the shoes includes a fluid pressure actuated motor 42 of conventional type secured to the backing plate and suitably connected to the toes or force applying ends of the respective shoes.

In a normal operation, during a forward braking application, upon energization of the motor 42, the shoes 14 and 16 are moved from their retracted position into engagement with the drum 12. In effecting this actuation of the shoes, the forward braking shoe 14 moves from its anchor 24 and is slightly shifted by the wiping action of the drum, and the trailing or reverse braking shoe pivots on its anchor 26. The applied force on the forward braking shoe 14 is augmented by the servo action of the shoe 14, and a part of the combined braking force of the shoe 14 is transmitted from the forward shoe 14, through the link 30, to the heel of the trailing or reverse braking shoe, so as to increase the effectiveness of the trailing or reverse braking shoe.

On a reverse braking application, the trailing or reverse braking shoe 16 becomes the forward braking shoe, and the forward braking shoe 14 becomes the reverse braking shoe. Under this condition, the shoe 16 moves from its anchor 26 and is slightly shifted by the wiping action of the drum, while the shoe 14 pivots on its anchor 24. The applied force on the shoe 16, augmented by the wiping action of the drum, is now partly transmitted through the link 30 to the toe of the shoe 14, so as to increase the effectiveness of the shoe 14, the shoe 16 functioning as a servo shoe as in the conventional duo-servo brake well known to those conversant in the art.

It is, of course, to be understood that while I have shown and described the brake operative as a link brake during a forward braking application, and as a duo-servo brake during a reverse braking application, these operations may well be reversed by simply reversing the brake as a whole, or by reversing the anchors for the respective shoe.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is—

1. A brake comprising a fixed support, a pair of anchors diametrically disposed on the support, a pair of shoes shiftably mounted on the anchors in tandem, and a link connecting the shoes within the radius of one of the anchors.

2. A brake comprising a fixed support, a pair of anchors diametrically disposed on the support, a pair of shoes shiftably mounted on the anchors in tandem, an adjustable link connecting the unanchored end of one of the shoes to the anchored end of the other shoe within the radius of one of the anchors and means for actuating the shoes.

3. A brake comprising a fixed support, a rotatable drum associated therewith, a pair of anchors diametrically disposed on the support, a pair of shoes shiftably mounted on the anchors in tandem, a link connecting the unanchored end of one of the shoes to the anchored end of the other shoe within the radius of one of the anchors, and a fluid pressure actuated motor connected to the anchored end of one of the shoes and the unanchored end of the other shoe.

4. A brake comprising a fixed support, a rotatable drum associated therewith, a pair of anchors diametrically disposed on the support, a pair of corresponding shoes shiftably mounted on the anchors, an adjustable link connecting the unanchored end of one of the shoes to the anchored end of the other shoe within the radius of one of the anchors, and a means for actuating the shoes.

5. A brake comprising a fixed support, a rotatable drum associated therewith, a pair of anchors diametrically disposed on the fixed support, a pair of corresponding interchangeable shoes shiftably mounted on the anchors in tandem, an adjustable link connecting one of the shoes adjacent its unanchored end to the other shoe adjacent its anchored end, and a motor for actuating the shoes connected between the anchored end of one of the shoes and the unanchored end of the other shoe.

6. A brake comprising a fixed support, a rotatable drum associated therewith, a pair of anchors diametrically disposed on the fixed support, a pair of shoes shiftably mounted on the anchors in tandem for cooperation with the drum, means connecting the shoes for transmitting force from the unanchored end of one of the shoes to the anchored end of the other shoe in one direction of braking and from the anchored end of one of the shoes to the unanchored end of the other shoe in the other direction of braking, and means for actuating the shoes.

HERBERT C. BOWEN.